(12) United States Patent
Tsaregorodtsev

(10) Patent No.: US 9,081,491 B2
(45) Date of Patent: Jul. 14, 2015

(54) CONTROLLING AND EDITING MEDIA FILES WITH TOUCH GESTURES OVER A MEDIA VIEWING AREA USING A TOUCH SENSITIVE DEVICE

(71) Applicant: COREL Corporation, Ottawa (CA)

(72) Inventor: Oleg Tsaregorodtsev, Mountain View, CA (US)

(73) Assignee: Corel Corporation, Ottawa (CA)

( * ) Notice: Subject to any disclaimer, the term of this patent is extended or adjusted under 35 U.S.C. 154(b) by 25 days.

(21) Appl. No.: 13/843,876

(22) Filed: Mar. 15, 2013

(65) Prior Publication Data

US 2013/0257770 A1 Oct. 3, 2013

Related U.S. Application Data

(60) Provisional application No. 61/618,580, filed on Mar. 30, 2012.

(51) Int. Cl.
*G06F 3/0488* (2013.01)
*G11B 27/034* (2006.01)
*G11B 27/34* (2006.01)

(52) U.S. Cl.
CPC .......... *G06F 3/0488* (2013.01); *G06F 3/04883* (2013.01); *G11B 27/034* (2013.01); *G11B 27/34* (2013.01)

(58) Field of Classification Search
CPC ... G06F 3/041; G06F 3/0488; G06F 3/04883; G06T 1/60; G11B 27/034; G11B 27/34
See application file for complete search history.

(56) References Cited

U.S. PATENT DOCUMENTS

| | | | | |
|---|---|---|---|---|
| 6,144,391 A * | 11/2000 | Hinson et al. | .......... | 345/540 |
| 2011/0157055 A1 * | 6/2011 | Tilley et al. | .......... | 345/173 |
| 2011/0242002 A1 * | 10/2011 | Kaplan et al. | .......... | 345/173 |
| 2011/0285658 A1 * | 11/2011 | Homma et al. | .......... | 345/173 |
| 2012/0056828 A1 * | 3/2012 | Miyazaki | .......... | 345/173 |

* cited by examiner

*Primary Examiner* — Andrew Sasinowski
(74) *Attorney, Agent, or Firm* — Rosenberg, Klein & Lee

(57) ABSTRACT

Methods, computer program products, and systems for controlling and editing video using a video editing application running on a touch screen device by using touch gestures on the media viewing area displayed by the video editing application. The methods involve displaying a frame of a video file in a preview area on a touch-sensitive display, detecting one or more touch points making initial contact at respective initial positions on the preview area, detecting the one or more touch points moving over the preview area, and in response to detecting the one or more touch points moving over the preview area determining a direction of motion of the one or more touch points, and if the direction of motion is horizontal, stepping through one or more frames of the video file in the preview area, and if the direction of motion is vertical, setting a cut point on the video file at the displayed frame of the video file.

14 Claims, 9 Drawing Sheets

CONTROLLING AND EDITING MEDIA FILES WITH TOUCH GESTURES OVER A MEDIA VIEWING AREA USING A TOUCH SENSITIVE DEVICE

CROSS-REFERENCE TO RELATED APPLICATION

This application claims benefit of U.S. Provisional Patent Application Ser. No. 61/618,580 filed Mar. 30, 2012, which is incorporated herein by reference in its entirety.

BACKGROUND

In desktop or laptop computer-implemented media editing applications, the user usually interacts with the application using a mouse, touch pad, and keyboard. With large, high resolution screens, users can point to and select one of a large array of displayed GUI objects or controls. For example, the user may add or remove various markers on a timeline representation of a media file while looking at a video source file or a preview of the composition being edited in a viewing pane.

Touch screens are increasingly being used as the primary interface for consumer level media composition and editing applications, especially on portable touch screen devices such as tablets. In order to implement media editing applications on such devices, the user interface must be tailored for small screens and a touch-based user interface. This involves reducing the functionality of the applications and adapting the controls for touch input. There is a need for a touch-based input gesture vocabulary that optimizes the use small screens and makes the interaction as intuitive as possible.

SUMMARY

In general, the methods, systems, and computer program products described herein enable a user of a touch screen-based video editing application to perform frame transport and editing operations with touch gestures on a video viewing are of the screen.

Using such functionality, an editor may remain focused on the media content without the need to locate control objects elsewhere in the user interface.

DETAILED DESCRIPTION

Existing methods of transport control and editing in non-linear video editing applications generally involve the use of various user interface elements such as buttons, sliders, jog-dials, and markers associated with objects distributed across the screen. Many editing functions, such as marking in and out, involve user interactions with a timeline representation of the media composition, such as inserting and dragging handles and markers.

This user interaction paradigm becomes impractical when the screen real estate that is available to the video editing applications is reduced from that of one or more large desktop monitors (e.g., 24-36 inch diagonal) to a single tablet touch screen (e.g., 10 inch diagonal). In a small screen implementation, a video editing application needs to make full use of each user interface element, and reduce the number and complexity of the controls to the practical minimum.

The methods, systems, and computer program products described herein serve this end by adding touch-based control capability to the media viewing area of non-linear video editing applications implemented on portable touch screen devices. Not only does this enable a set of controls to be eliminated, it also enables the editor to retain focus on the media being edited, without the need to search elsewhere in the user interface to locate and then control external control objects. We describe embodiments that enable touch gestures to control media transport and editing cut points. Other embodiments enable additional video editing functionality to be implemented using touch gestures over the viewing area.

Figure 1:
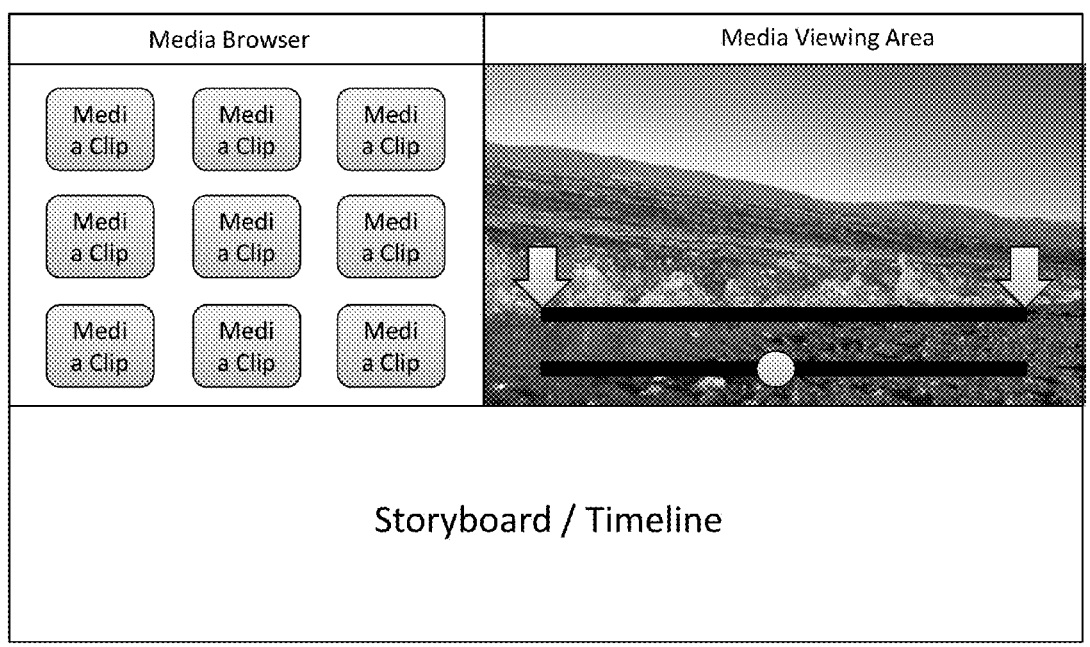
FIG. 1 is an illustration of a screen shot of a canonical video editing application running on a touch-sensitive device with a video file loaded.

The canonical layout of the user interface of a non-linear video editing application is illustrated in FIG. 1. At top right is the media viewing area, which is used both to preview source assets and to view a media composition corresponding to the current timeline sequence. The media viewing area is sometimes referred to as the preview window, preview pane, or source monitor window. A timeline is superposed either temporarily or permanently over the currently displayed media in the media viewing area, together with the location of the playhead corresponding to the currently displayed frame. The playhead moves along the timeline as the displayed frame advances or steps back in the temporal sequence of frames that make up the composition. At top right is a media browser area for indicating the set of source assets available to the editor for the currently active media composition project. This area is often referred to as a project bin, or the source asset folder. In the example represented in FIG. 1, the video source clips are represented as icons in the media browser area. Below the viewing area, the application displays a timeline and optionally a storyboard representation. The timeline is a linear temporal analog of the composition, showing the sequence of clips making up the composition. Various components of the composition are often represented by multiple tracks in the timeline, such as audio tracks and special effect tracks. The storyboard indicates the elements of the composition using thematic (i.e., story) labels, and places the elements in the sequence in which they appear in the composition without any representation of each element's temporal duration. In general, each item in a story board has the same size, or has a size determined by graphical layout considerations, such as the length of its thematic label text.

Figure 2:
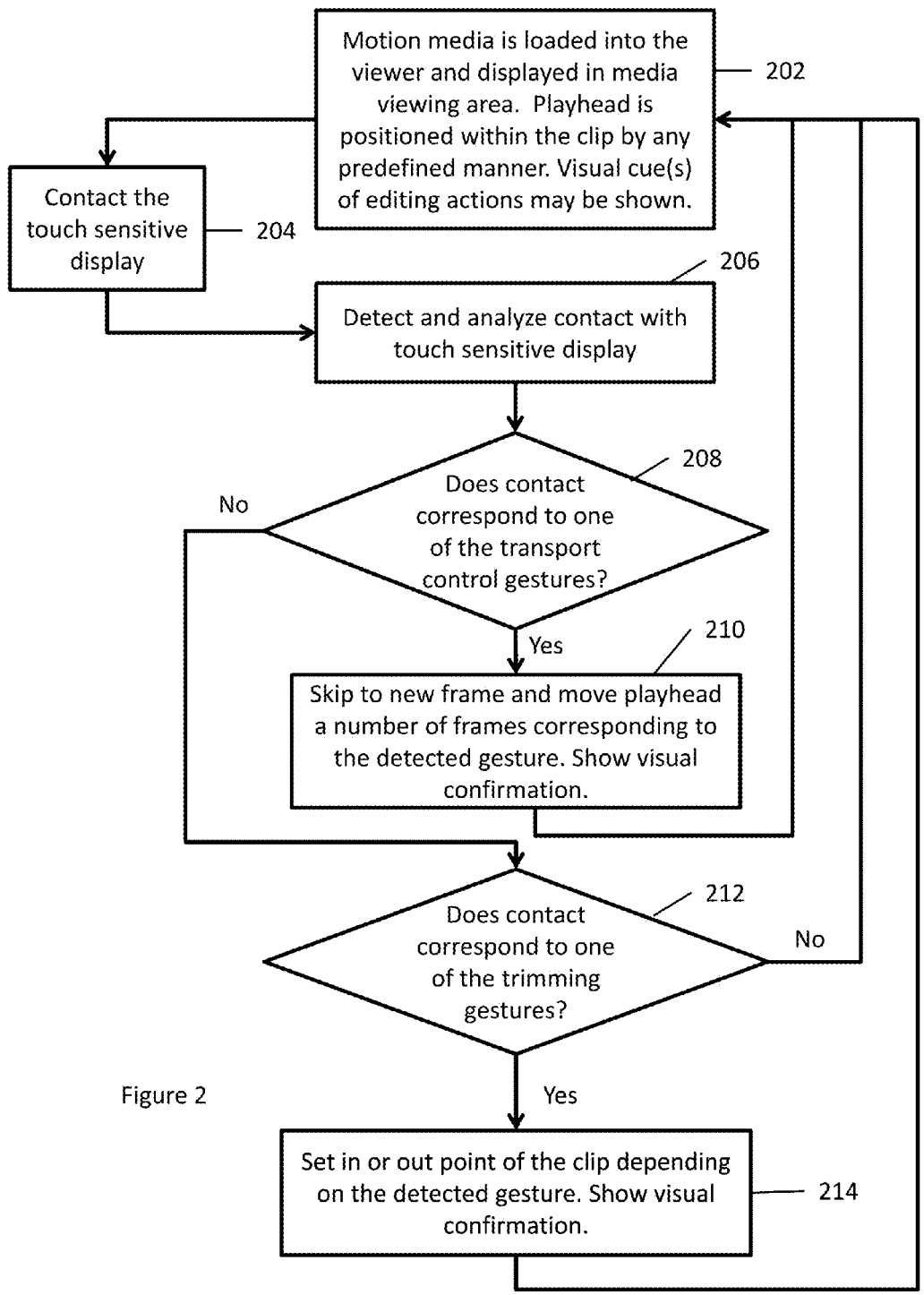
FIG. 2 is a high level flow diagram showing the steps involved in using a touch-sensitive device to respond to touch gestures to move the playhead or to trim a video clip.

A high level flow diagram of the steps involved in implementing the described gestural interface is shown in FIG. 2.

The steps may be implemented when computer-readable instructions are executed by a processor in data communication with a touch screen display on a mobile computer-based device, such as a tablet computer. The motion media is loaded into the viewer and displayed in the media viewing area (202). The playhead is positioned within the clip by any predefined manner. When the user contacts the touch screen (204), the device detects the contact, and analyses the movement of the contact point over time (206). It then determines whether the contact corresponds to one a transport control gesture (208), and if yes, the application skips the number of frames that corresponds to the detected gesture, and also advances the playhead by that number of frames (210), then looping back to the first step (202). If the detected gesture does not correspond to one of the transport control gestures, the application then determines if the gesture corresponds to one of the trimming (i.e., editing—mark-in/mark-out) gestures (212). If the determination is positive, the corresponding in or out points are set, and a visual confirmation is given to the user (214), and the application loops back to the first step (202).

Users often have difficulty stepping through video frames with high precision and control. Existing methods of achieving accurate control involve the use of buttons and jog dials. In many applications, accurate control of frames with a granularity of individual frames is not possible, as for example, when transport control is implemented by moving an object along the timeline.

Figure 3A:
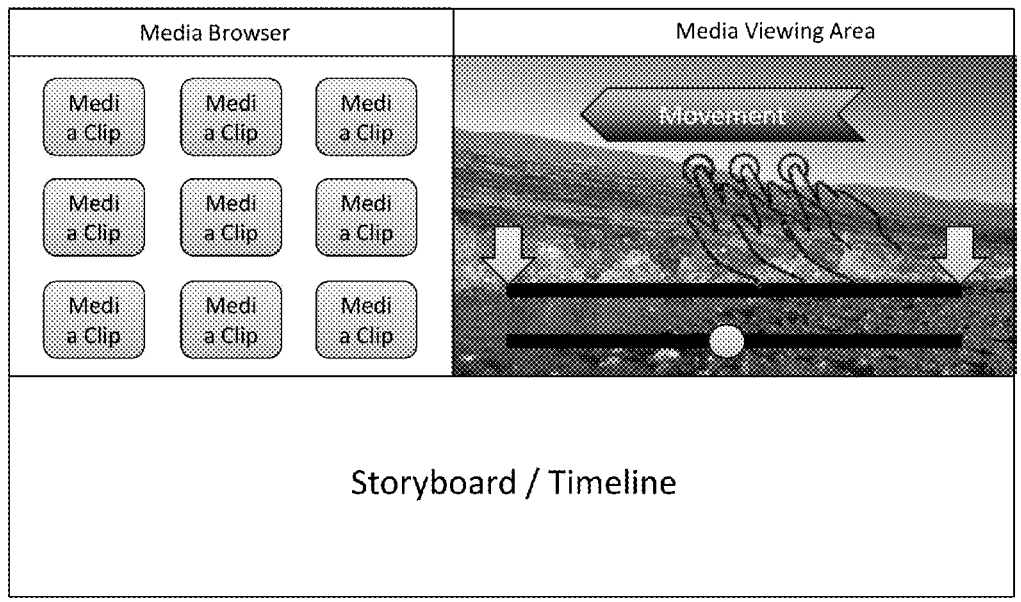
FIGS. 3A and 3B are illustrations of screen shots of the video editing application of FIG. 1 showing the use of horizontal swiping gestures to skip one frame forward.
Figure 3B:
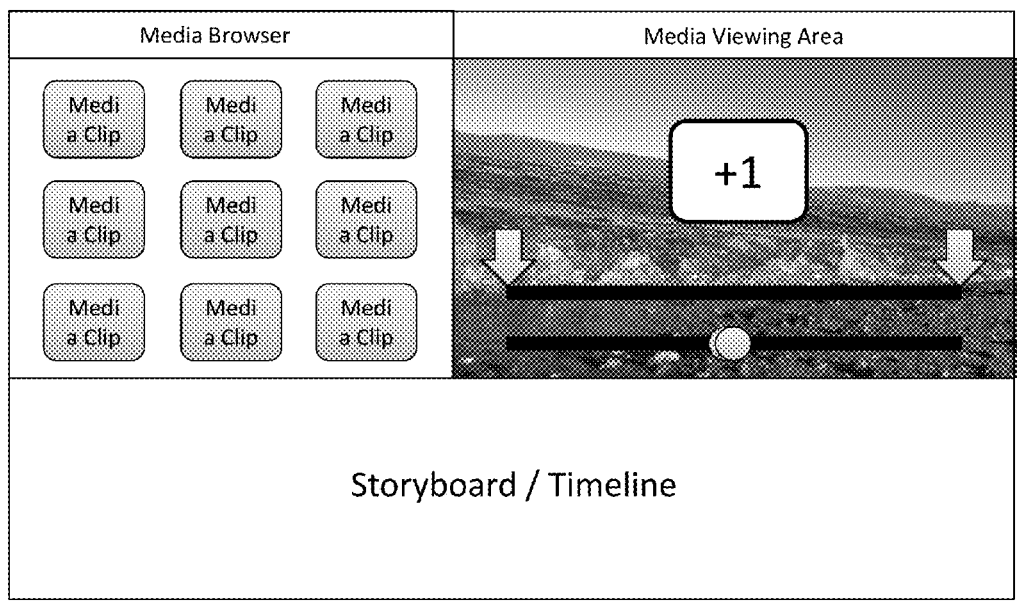
Figure 4A:
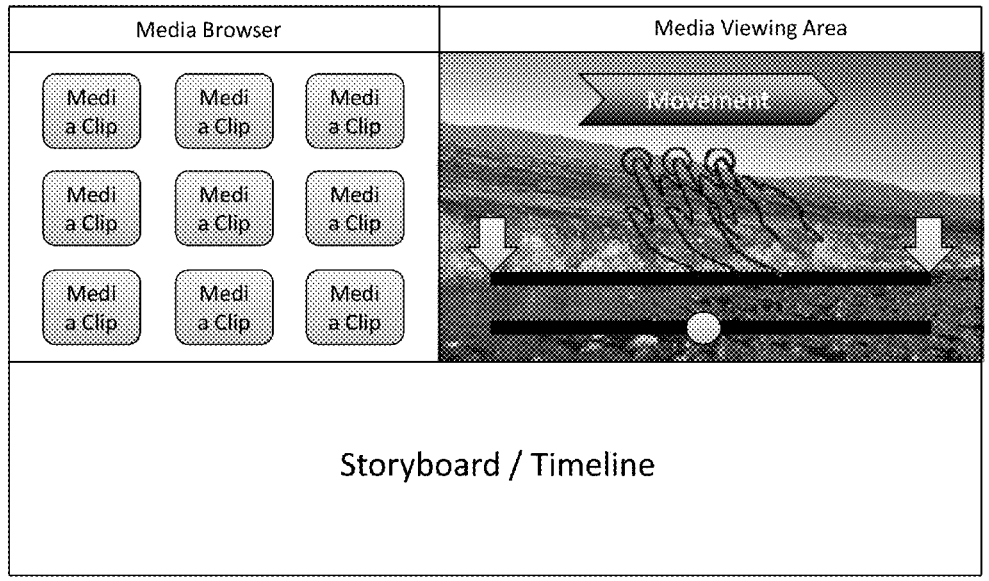
FIGS. 4A and 4B are illustrations of screen shots of the video editing application of FIG. 1 showing the use of horizontal swiping gestures to skip one frame backward.
Figure 4B:
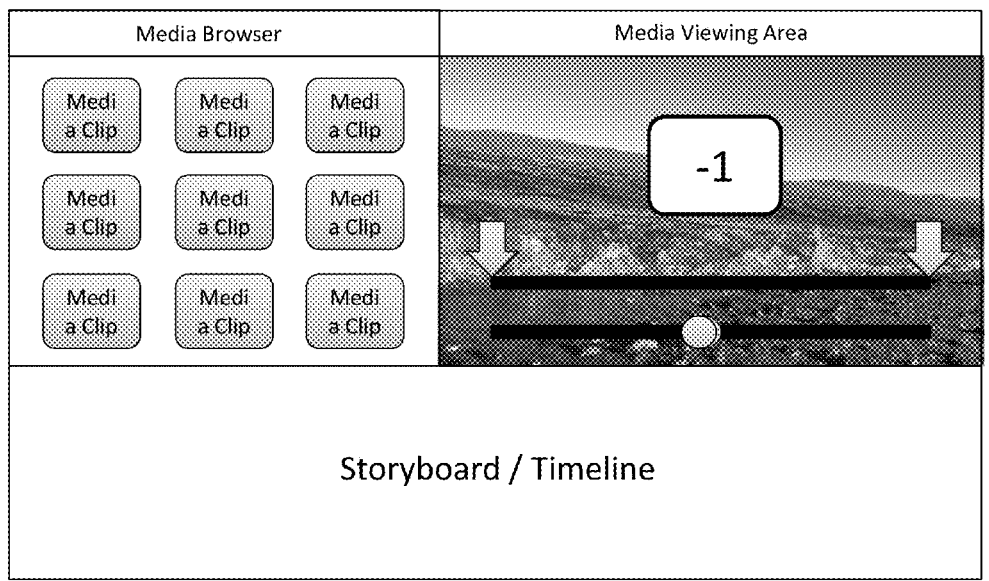
Figure 5A:
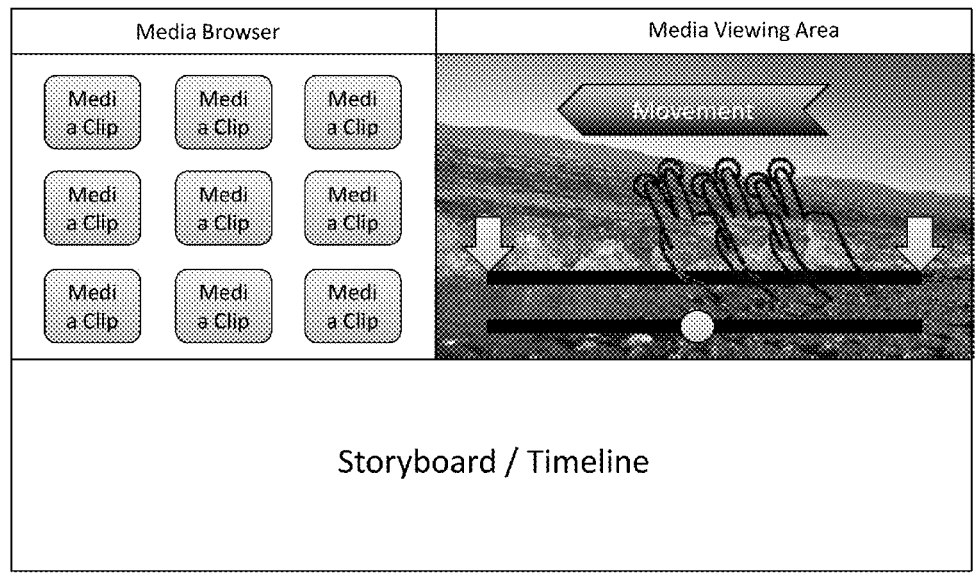
FIGS. 5A and 5B are illustrations of screen shots of the video editing application of FIG. 1 showing the use of horizontal swiping gestures to skip forward multiple frames.
Figure 5B:
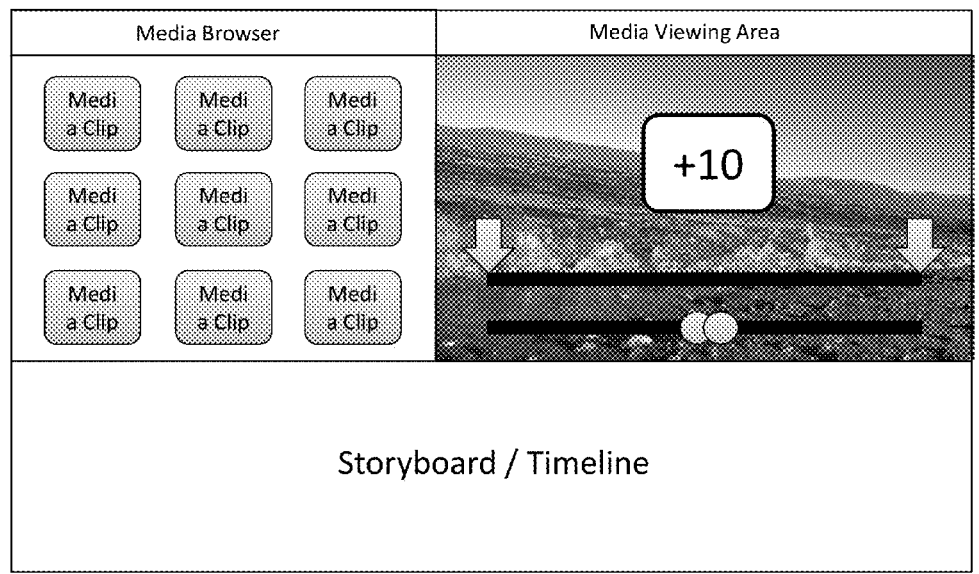

To enable accurate, frame-by-frame transport control in a video clip without requiring the editor to look outside the media viewing area, a transport control gesture is used, as illustrated in FIGS. 3-5. The gesture involves a substantially horizontal swiping motion over the media viewing area. The horizontal direction is defined with respect to the horizontal axis of the video, i.e., when the video is viewed the right way up, the horizontal axis is oriented in the left-right direction. In various embodiments, a single finger horizontal swipe causes the video to skip a single frame forward or back, with a right-to-left direction of movement causing the application to display the immediately succeeding video frame of the video clip being viewed, and a left-to-right direction of movement causing the application to display the immediately preceding video frame of the video clip being viewed. (FIGS. 3A and 3B).

Once the application has received the control gesture and responded accordingly, it provide the user with feedback indicating that the requested action has been taken. For example, when advancing a single frame, a "+1" is temporarily displayed over the new frame in the media viewing area, and when going back one frame, a "−1" is temporarily displayed.

To advance or go back more than one frame, the horizontal swipe is performed with more than one finger. For example, with two fingers, the system may advance or go back a predetermined number of between about five and fifteen frames when the application detects a multi-finger swipe from right to left or left to right respectively. The predetermined number may be selected by the editor, or may be preset to a default number. (FIGS. 4A, 4B, 5A, and 5B).

In a further refinement of the multi-finger horizontal swipe transport control gesture, the number of frames skipped may be based, at least in part, on the number of fingers detected in the swipe gesture. For example, two fingers may cause the application to skip a first predetermined number, three fingers a second predetermined number, and so on up to five fingers. Each of the predetermined numbers may be user-selectable or preset, and may be the same as each other or different. An intuitively simple use of this feature is to increase the number of frames skipped with each additional finger detected. A particular number of detected fingers may also be interpreted by the application to cause the displayed frame to skip to the first frame of the next or previous clip, depending on the swipe direction. Appropriate visual feedback is provided by a temporary display over the video viewing are for each frame skipping operation.

Figure 6A:
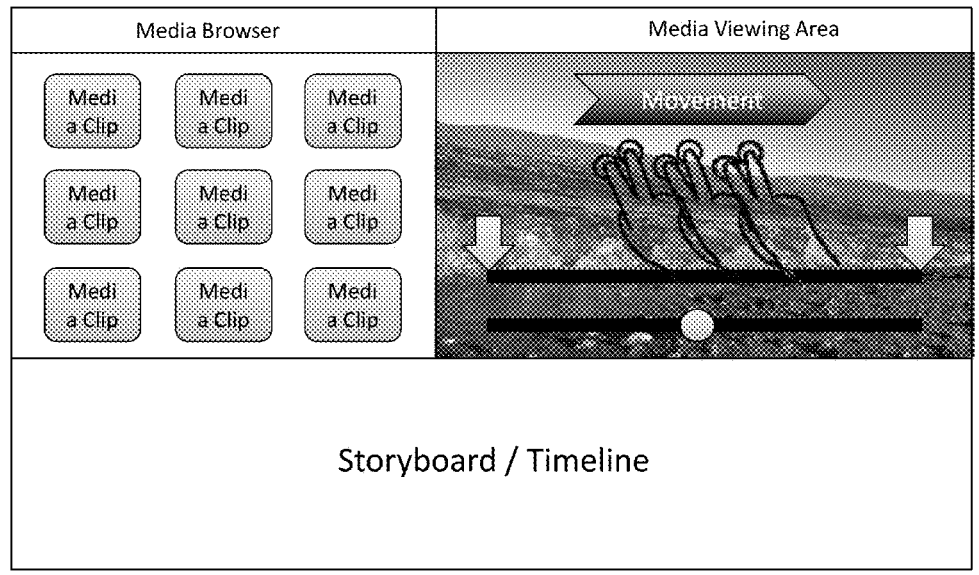
FIGS. 6A and 6B are illustrations of screen shots of the video editing application of FIG. 1 showing the use of horizontal swiping gestures to skip backward multiple frames.
Figure 6B:
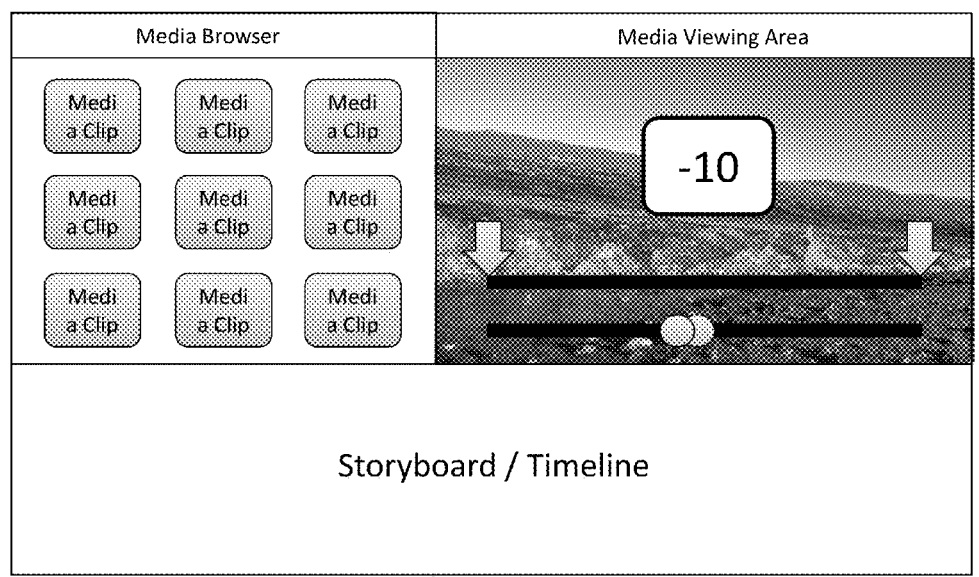
Figure 7A:
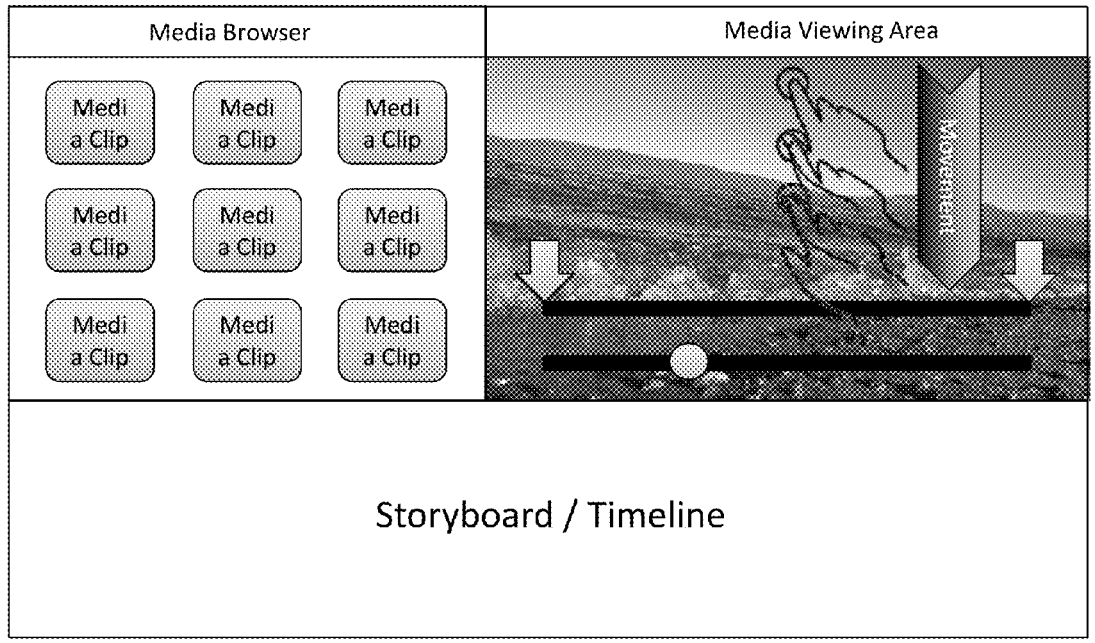
FIGS. 7A and 7B are illustrations of screen shots of the video editing application of FIG. 1 showing the use of vertical swiping gestures to insert a mark-in cut point.
Figure 7B:
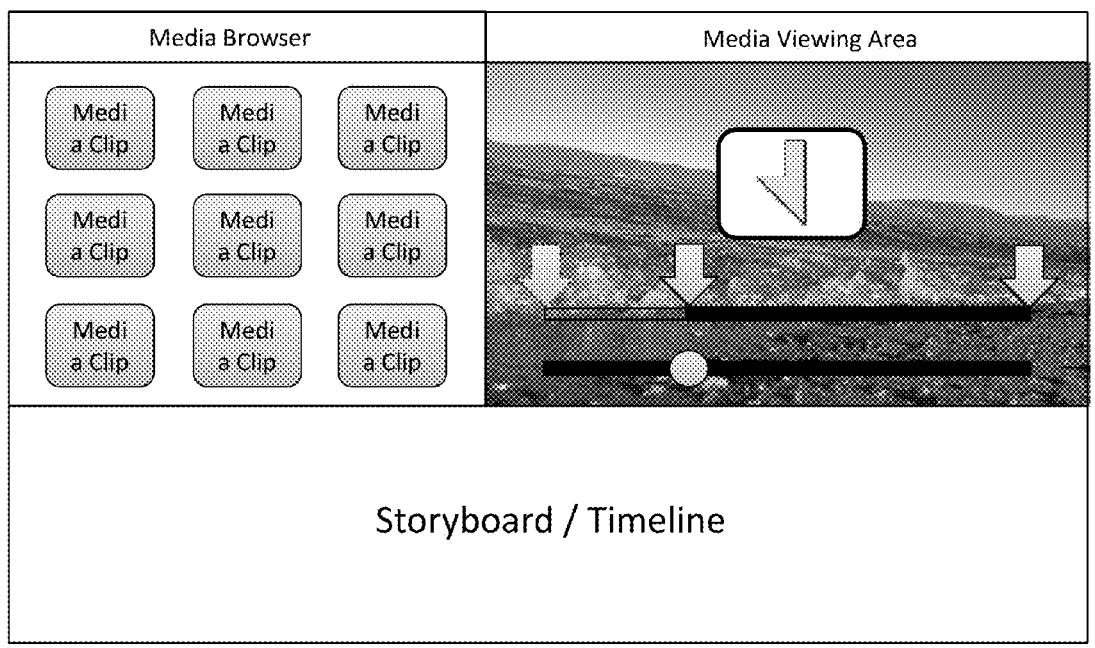
Figure 8A:
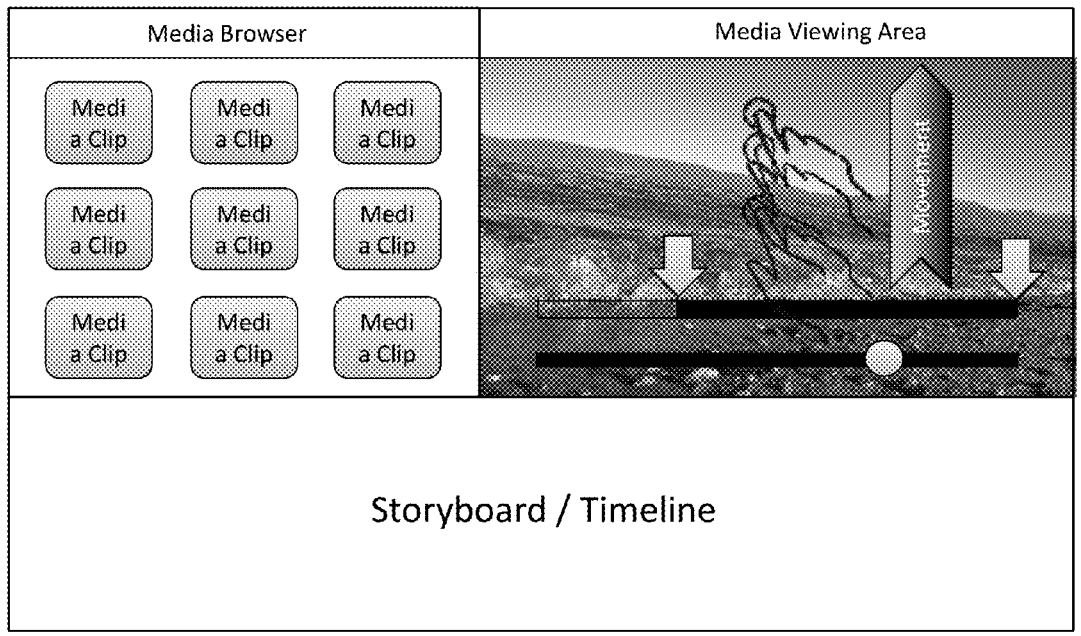
FIGS. 8A, 8B, and 8C are illustrations of screen shots of the video editing application of FIG. 1 showing the use of vertical swiping gestures to insert a mark-out cut point.
Figure 8B:
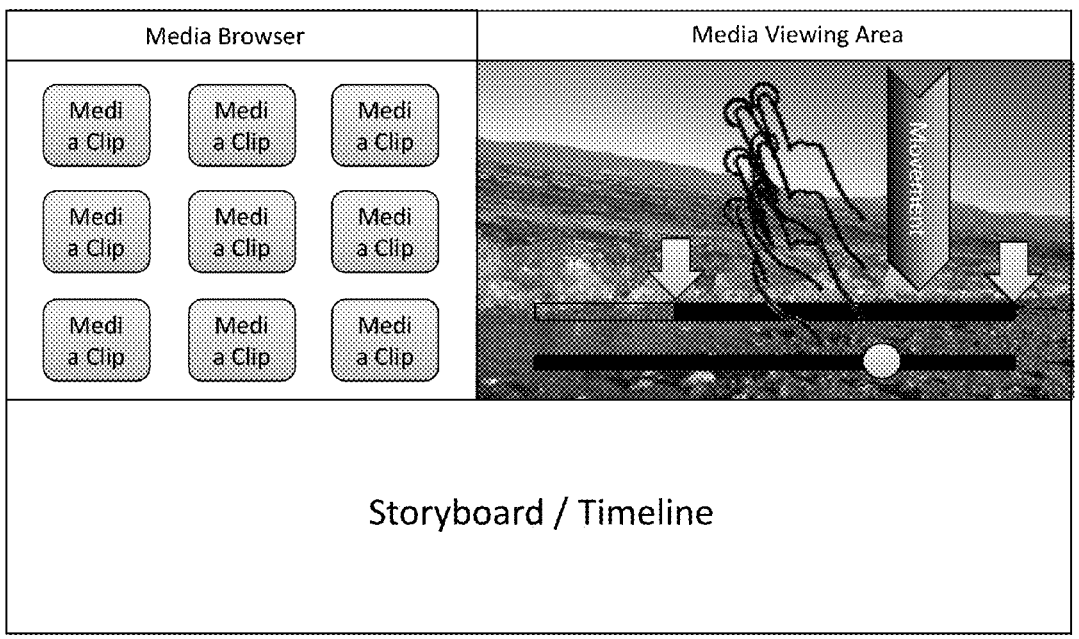
Figure 8C:
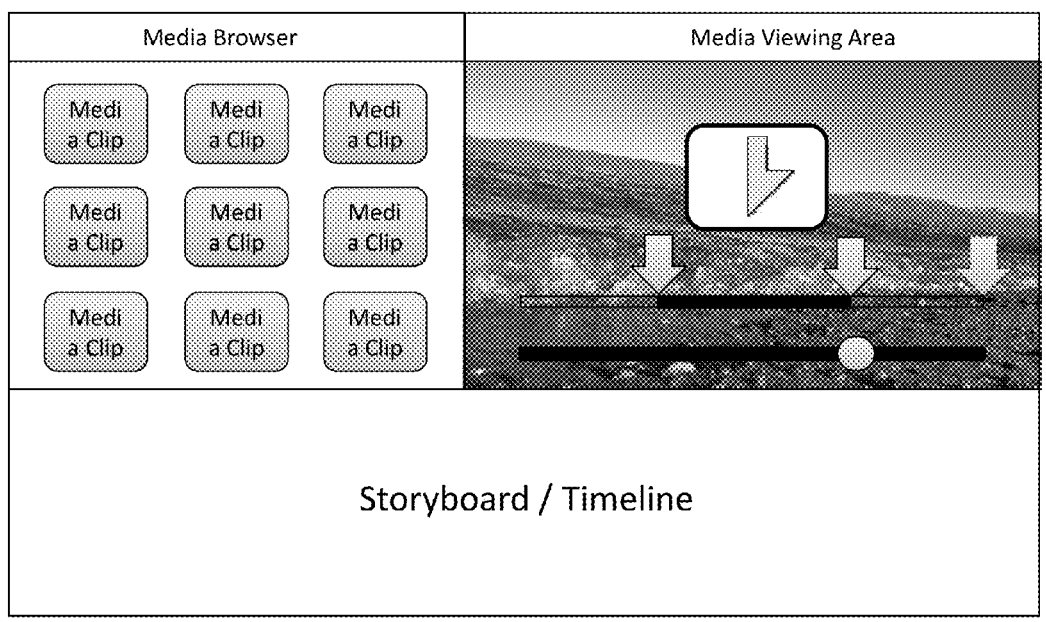

Another application of gestural input over the media viewing area is to set cut points, including a mark-in point where the clip is to start playing in the edited composition, and mark-out points where the clip is to end, as illustrated in FIGS. 6-7. A gesture that is substantially aligned with the vertical axis of the currently displayed video is used to set cut points. In various embodiments, a single finger swipe down over the media viewing area is interpreted as an instruction to set a mark-in point at the currently displayed frame (FIG. 6A); and a single finger swipe up is interpreted as an instruction to set a mark-out point at the currently displayed frame (FIG. 7A). A two or more finger swipe down may also be interpreted as setting a mark-out point (FIG. 7B). The system provides immediate feedback to the user by placing markers at the corresponding locations on a timeline representation of the composition (FIGS. 6B and 7C). In order to obviate the need to the editor to divert her attention from the media viewing area, the timeline with newly inserted cut points and playhead position may be superposed on the media viewing area, at least temporarily.

A mobile touch screen device upon which the described input, control, and editing methods may be implemented includes a memory, a memory controller, one or more processing units (CPU's), a peripherals interface, RF circuitry, optionally audio circuitry and a speaker and microphone, an input/output (I/O) subsystem, a touch screen, other input or control devices, and an external port. These components communicate over the one or more communication buses or signal lines. The device can be any portable electronic device, including but not limited to a handheld computer, a tablet computer, a mobile phone, a media player, a personal digital assistant (PDA), or the like, including a combination of two or more of these items. The various components of the mobile device may be implemented in hardware, software or a combination of both hardware and software, including one or more signal processing and/or application specific integrated circuits.

The memory may include high speed random access memory and may also include non-volatile memory, such as one or more magnetic disk storage devices, flash memory devices, or other non-volatile solid state memory devices. In some embodiments, the memory may further include storage remotely located from the one or more processors, for instance network attached storage accessed via the RF circuitry or external port and a communications network (not shown) such as the Internet, intranet(s), Local Area Networks (LANs), Wide Local Area Networks (WLANs), Storage Area Networks (SANs) and the like, or any suitable combination thereof. Access to the memory by other components of the device, such as the CPU and the peripherals interface, may be controlled by the memory controller.

The peripherals interface couples the input and output peripherals of the device to the CPU and the memory. The one or more processors run various software programs and/or sets of instructions stored in the memory to perform various functions for the device 100 and to process data.

In some embodiments, the peripherals interface, the CPU, and the memory controller may be implemented on a single chip. In some other embodiments, they may be implemented on separate chips.

The RF (radio frequency) circuitry receives and sends electromagnetic waves. The RF circuitry converts electrical signals to/from electromagnetic waves and communicates with communications networks and other communications devices via the electromagnetic waves. The RF circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry may communicate with the networks, such as the Internet, also referred to as the World Wide Web (WWW), an Intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry, the speaker, and the microphone provide an audio interface between a user and the device, and may also provide a communications channel between the device and the host computer for exchange of an access key and other information. The audio circuitry receives audio data from the peripherals interface, converts the audio data to an electrical signal, and transmits the electrical signal to the speaker. The speaker converts the electrical signal to human-audible sound waves. The audio circuitry also receives electrical signals converted by the microphone from sound waves. The audio circuitry converts the electrical signal to audio data and transmits the audio data to the peripherals interface for processing. Audio data may be may be retrieved from and/or transmitted to the memory and/or the RF circuitry by the peripherals interface 108. In some embodiments, the audio circuitry also includes a headset jack (not shown). The headset jack provides an interface between the audio circuitry and removable audio input/output peripherals, such as output-only headphones or a headset with both output (headphone for one or both ears) and input (microphone).

The I/O subsystem provides the interface between input/output peripherals on the device, such as the touch screen and other input/control devices, and the peripherals interface. The I/O subsystem includes a touch-screen controller and one or more input controllers for other input or control devices. The one or more input controllers receive/send electrical signals from/to other input or control devices. The other input/control devices may include physical buttons (e.g., push buttons, rocker buttons, etc.), dials, slider switches, sticks, and so forth.

The touch screen provides both an output interface and an input interface between the device and a user. The touch-screen controller receives/sends electrical signals from/to the touch screen. The touch screen displays visual output to the user. The visual output may include text, graphics, video, and any combination thereof. Some or all of the visual output may correspond to user-interface objects, further details of which are described below.

The touch screen may use LCD (liquid crystal display) technology, or LPD (light emitting polymer display) technology, although other display technologies may be used in other embodiments. The touch screen and touch screen controller may detect contact and any movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

The mobile device also includes a power system for powering the various components. The power system may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the software components include an operating system, a communication module (or set of instructions), a graphics module (or set of instructions), a user interface state module (or set of instructions), and one or more applications (or set of instructions).

The communication module facilitates communication with other devices over one or more external ports and also includes various software components for handling data received by the RF circuitry 112 and/or the external port. The external port (e.g., Universal Serial Bus (USB), FIREWIRE, etc.) is adapted for coupling directly to other devices or indirectly over a network (e.g., the Internet, wireless LAN, etc.).

The various components of a host or server computer system in data communication with the touch screen mobile device may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid state drives, which may include an array of local or network attached disks.

A system such as described herein may be implemented in software or hardware or firmware, or a combination of the three. The various elements of the system, either individually or in combination may be implemented as one or more computer program products in which computer program instructions are stored on a non-transitory computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method comprising:
   at a computing device with a touch-sensitive display:
   displaying a frame of a video file in a preview area on the touch-sensitive display;
   detecting one or more touch points making initial contact at respective initial positions on the preview area;
   detecting the one or more touch points moving over the preview area; and
   in response to detecting the one or more touch points moving over the preview area:
   determining a direction of motion of the one or more touch points; wherein
   if only a single touch point is detected and the direction of motion is substantially parallel to the horizontal axis of the displayed video frame then:
   if the determined direction of motion is substantially from right to left with respect to the horizontal axis of the displayed video frame stepping forward one frame of the video file in the preview area; and
   if the determined direction of motion is substantially from left to right with respect to the horizontal axis of the displayed video frame stepping backward one frame of the video file in the preview area; and
   if only a single touch point is detected and the direction of motion is substantially parallel to the vertical axis of the displayed video frame then:
   if the determined direction of motion is substantially from top to bottom with respect to the vertical axis of the displayed video frame setting a mark-in point on the video file at the displayed frame of the video file in the preview window; and
   if the determined direction of motion is substantially from bottom to top with respect to the vertical axis of the displayed video frame setting a mark-out point on the video file at the displayed frame of the video file in the preview window.

2. The method according to claim 1, further comprising providing to the user a visual indication of the action performed.

3. A method comprising:
   at a computing device with a touch-sensitive display:
   displaying a frame of a video file in a preview area on the touch-sensitive display;
   detecting one or more touch points making initial contact at respective initial positions on the preview area;
   detecting the one or more touch points moving over the preview area; and
   in response to detecting the one or more touch points moving over the preview area:
   determining a direction of motion of the one or more touch points; wherein
   if more than one touch point is detected and the direction of motion is substantially parallel to the horizontal axis of the displayed video frame then:
   if the determined direction of motion is substantially from right to left with respect to the horizontal axis of the displayed video frame stepping a first predetermined number of frames forward in the video file in the preview area; and
   if the determined direction of motion is substantially from left to right with respect to the horizontal axis of the displayed video frame stepping a second predetermined number of frames backward in the video file in the preview area.

4. The method according to claim 3, wherein either the first predetermined number of frames or the second predetermined number of frames is established in dependence upon the number of touch points.

5. The method according to claim 3, wherein either the first predetermined number of frames or the second predetermined number of frames is established in dependence upon the number of touch points; and either the first predetermined number of frames or the second predetermined number of frames is preset or user selectable.

6. The method according to claim 3, further comprising providing to the user a visual indication of the action performed.

7. The method according to claim 3, further comprising providing to the user a visual indication of the action performed, and where the action corresponds to a movement of the video file within the preview window providing an indication of the number of frames moved and an indication of the direction of movement.

8. The method according to claim 3, further comprising
if more than one touch point is detected and the direction of motion is substantially parallel to the vertical axis of the displayed video frame:
  if the determined direction of motion is substantially from bottom to top with respect to the vertical axis of the displayed video frame setting a mark-in point at the displayed video frame in the preview window; and
  if the determined direction of motion is substantially from top to bottom with respect to the vertical axis of the displayed video frame setting a mark-out point at the displayed video frame in the preview window.

9. A method comprising:
at a computing device with a touch-sensitive display:
  displaying a frame of a video file in a preview area on the touch-sensitive display;
  detecting one or more touch points making initial contact at respective initial positions on the preview area;
  detecting the one or more touch points moving over the preview area; and
  in response to detecting the one or more touch points moving over the preview area:
  determining a direction of motion of the one or more touch points; wherein
    if more than one touch point is detected and the direction of motion is substantially parallel to the horizontal axis of the displayed video frame then:
      if the determined direction of motion is substantially from right to left with respect to the horizontal axis of the displayed video frame determining the number of touch points and stepping forward to a predetermined point in the video file in the preview area; or
      if the determined direction of motion is substantially from left to right with respect to the horizontal axis of the displayed video frame determining the number of touch points and stepping backward to a predetermined point in the video file in the preview area.

10. The method according to claim 9, wherein
the predetermined point in the video file is either a predetermined number of frames away from the current frame established in dependence upon the number of touch points or a different clip for a predetermined number of touch points in a direction established by the direction of motion.

11. The method according to claim 9, wherein
the predetermined number of frames is either preset or user selectable.

12. The method according to claim 9, further comprising
providing to the user a visual indication of the action performed.

13. The method according to claim 9, further comprising
providing to the user a visual indication of the action performed, and
where the action corresponds to a movement of the video file within the preview window providing an indication of the movement made and an indication of the direction of movement.

14. The method according to claim 9, further comprising
if more than one touch point is detected and the direction of motion is substantially parallel to the vertical axis of the displayed video frame:
  if the determined direction of motion is substantially from bottom to top with respect to the vertical axis of the displayed video frame setting a mark-in point at the displayed video frame in the preview window; and
  if the determined direction of motion is substantially from top to bottom with respect to the vertical axis of the displayed video frame setting a mark-out point at the displayed video frame in the preview window.

* * * * *